Jan. 28, 1969　　　　J. MARCHAND　　　　3,424,825
METHOD OF MANUFACTURING PACKAGED ARTICLES
Filed Feb. 9, 1966　　　　　　　　　　　　Sheet 1 of 2

INVENTOR.
JACQUES MARCHAND

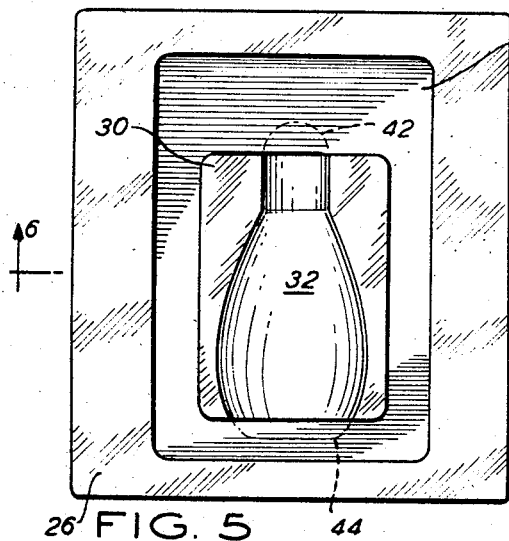
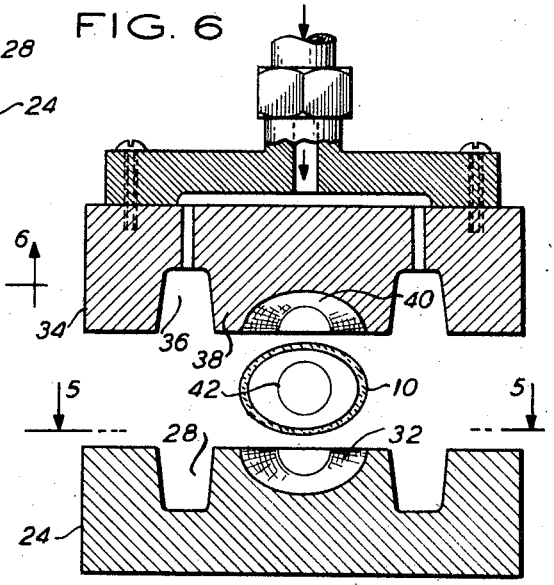
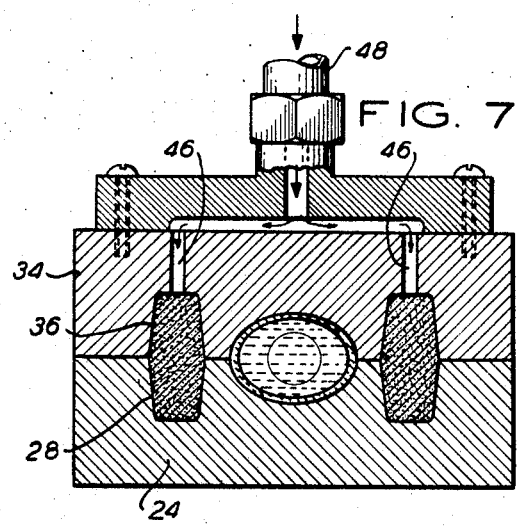
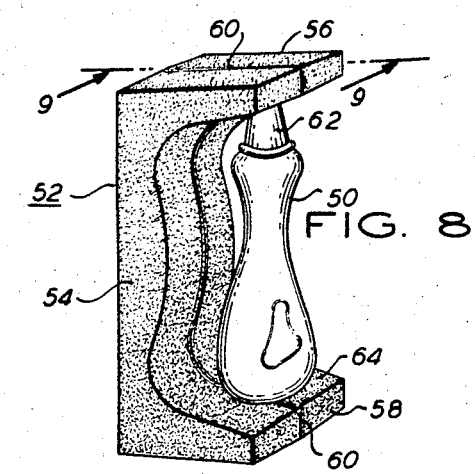
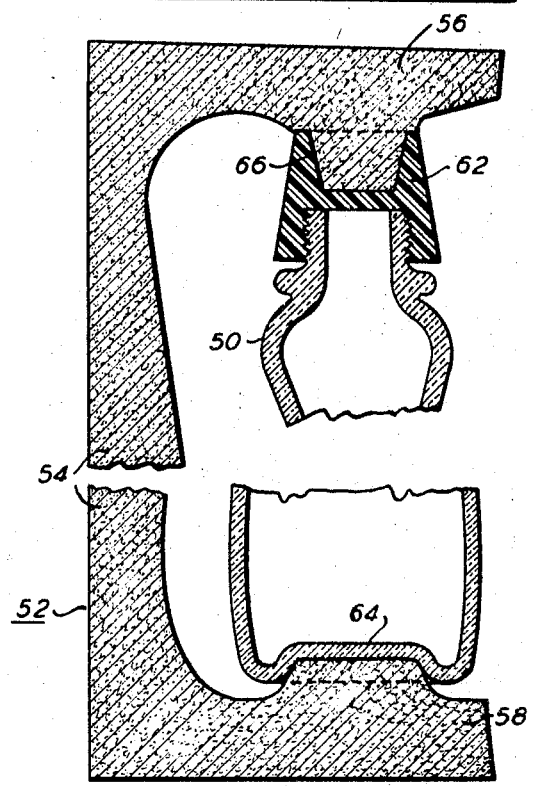
INVENTOR
JACQUES MARCHAND
BY ATTORNEY

United States Patent Office 3,424,825
Patented Jan. 28, 1969

3,424,825
METHOD OF MANUFACTURING PACKAGED ARTICLES
Jacques Marchand, 381 Broad St., Newark, N.J. 07102
Continuation-in-part of application Ser. No. 298,374, July 29, 1963. This application Feb. 9, 1966, Ser. No. 533,760
U.S. Cl. 264—45
Int. Cl. B65d 65/44
2 Claims

ABSTRACT OF THE DISCLOSURE

A method of packaging an article of merchandise comprising a mold having a first article receiving cavity therein designed to envelop the article 360° about its surface over substantially its entire length and providing the mold with a second cavity extending continuously about the article receiving cavity from one end thereof to the other, placing an article into the article receiving cavity with its end extending into the second cavity, filling the second mold cavity with moldable material so that when solidified, the moldable material will form an integral solid protective frame supporting the ends of the article with the article having 360° exposure about its surface over substantially its entire length.

---

This application is a continuation-in-part of my earlier filed application, Ser. No. 298,374 filed July 29, 1963, now abandoned.

In general, this invention relates to a new and improved method of manufacturing a packaged article of merchandise and, more particularly, to a package for display articles which package acts as an integral protecting container for the article in transportation and in handling while allowing 360° exposure so that it can be viewed substantially in its entirety.

In the past, articles of merchandise have been shipped and displayed in boxes which required packaging of the article and which boxes could be crushed in handling and, additionally, did not allow the product to be viewed substantially in its entirety.

In more recent practice, some products have been made part of an integral package by molding a protective material thereabout with little thought being given to the ultimate display of the product when placed on sale. This material was of a low density and had a cushioning effect. Examples of these materials are polyurethane foam or polystyrene foam. Molding as achieved in the prior art had many disadvantages. First, the molding material obscured the product and detracted from the overall appearance of the final package. Thus, the customers were unable to fully see the product they were purchasing. Additionally, the protective material forming the package was not easily removed from the article thus making it difficult for the customers to obtain access to the product. Still further, since most of the molding processes required the use of hot mold material, which of necessity, came into contact with a large portion of the product, this heat could change the characteristic of the packaged product which was, of course, undesirable.

Accordingly, it is the general object of this invention to avoid and overcome the foregoing and other difficulties of prior art practices by the provision of a new and better method of manufacturing a packaged article of merchandise.

Another object of this invention is the provision of a new and better method of manufacturing a packaged article of merchandise which is provided with a unitary protective structure thereabout which provides 360° exposure over its entire length thus allowing the article packaged to be viewed substantially in its entirety.

Still another object of this invention is the provision of a new and better method of packaging an article which includes providing an integral unitary structure to support the article without substantially heating the article during the molding process.

A further object of this invention is the provision of a new and better method of manufacturing a package for an article the package of which enables a customer to easily remove the article from the package while still maintaining the advantages of substantial viewing of the article over its entire length and support for the article in a manner which enhances its ability to be stacked with other similar packages.

Other objects will appear hereinafter.

For the purpose of illustrating the invention, there are shown in the drawings forms which are presently preferred; it being understood, however, that this invention is not limited to the precise arrangements and instrumentalities shown.

In accordance with my invention, the article to be packaged is placed in a mold whereby the mold extends 360° about the article over substantially its entire length with only minimal support portion at the ends of the article being exposed within the mold cavtiy. Then, the mold material is either poured or injected into the mold cavity to form a protective package which, when removed from the mold, will provide support for the article at the ends thereof, will allow 360° viewing of the article over substantially its entire length, will allow stacking of the packages with similar packages in a convenient manner, and which will allow easy removal of the article from the package as by manual tearing or breaking and then discarding of the package. The final package may be O-, C-, or other shaped in accordance with the desired result. It will be understood that a C-shaped package will afford easier viewing of the article and, additionally, will enable a customer to more easily remove the article from the package as by mere flexing or breaking of one of the horizontal legs of the C-shaped package.

The placement of the article within the mold in a manner whereby only the support ends of the article are within the mold cavity prevents undue heating of the article which could destroy properties of the article. In the past, articles have been packaged by molding a plastic material thereabout. This has caused unnecessary heating of the article which, with certain products, was extremely undesirable and, further, prevented the use of such a process with these articles.

The drawings illustrate the invention, and in these:

FIGURE 5 is a top plan view of one-half of a mold utilized to package an article in a unitary protective frame as shown in FIGURE 1;

FIGURE 6 is a cross-sectional view of the molding apparatus utilized to produce an article of merchandise in a unitary protective frame taken along lines 6—6 of FIGURE 5;

FIGURE 7 is a cross-sectional view similar to FIGURE 6 showing the mold in the closed position with mold material being forced into the mold cavity;

FIGURE 8 is a perspective view of a second article of merchandise held in a different unitary protective frame molded onto the article built in accordance with the principles of the present invention;

FIGURE 9 is a cross-sectional view of the packaged article of FIGURE 8 taken along lines 9—9.

Figure 2:
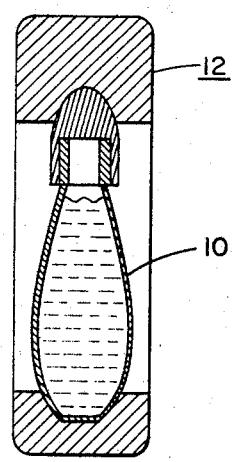
FIGURE 2 is a vertical section of lines 2—2 of FIGURE 1.
Figure 1:
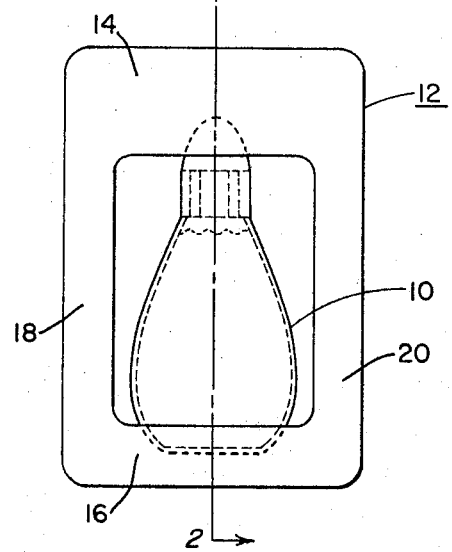
FIGURE 1 is a front elevational view of an article of merchandise held at its top and bottom in a unitary protective frame molded onto the article.

In FIGURES 1 and 2 there is shown an article of manufacture 10 in the form of a bottle containing a liquid, as perfume for example. A unitary or integral protective frame 12, of foam or expandable polystyrene, is molded onto and around the top and bottom portions only of the bottle to hold it firmly in place, leaving the major portion thereof exposed in view but protected for shipment. The frame 12 consists of a top wall 14 and a bottom wall 16 joined by parallel side walls 18 and 20. It can be seen that only that portion of the top and bottom of the bottle 10 necessary to achieve support for the bottle 10 is held by the top and bottom walls 14 and 16 of the frame 12. The bottle 10 is viewable for 360° along substantially its entire length.

The side walls 18 and 20 of the frame 12 are thicker than the walls of the bottle 10 thus protecting the bottle 10 against longitudinal compression. Further, all dimensions of the frame 12 are greater than similar dimensions of the bottle 10 so that no portion of the bottle 10 is exposed beyond the plane of the facing walls of the frame 12. The front, back, sides, and top and bottom of the frame are flat so that the packaged article is stackable in a simple and easy manner.

Figure 4:
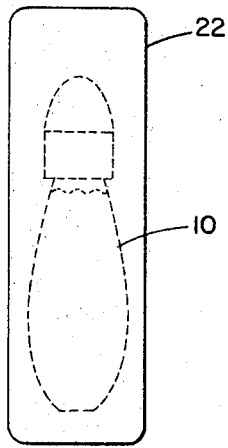
FIGURE 4 is a side elevational view of FIGURE 3.
Figure 3:
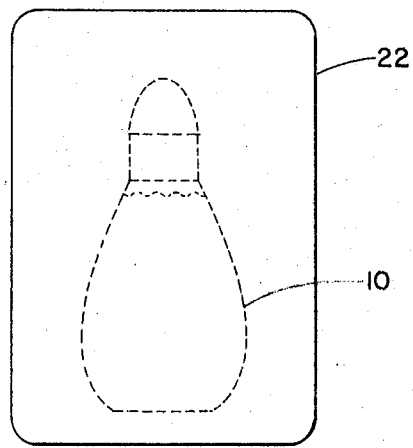
FIGURE 3 is a front elevational view of an article of merchandise entirely surrounded or enveloped by a protective material.

In FIGURES 3 and 4 there is shown the article 10 completely enveloped by a frame 22, a molded enclosure 22 which is of greater height, width and thickness than the bottle 10 and molded onto the bottle when the latter forms the core of a mold. This package has the disadvantage of the prior art in that it does not allow the article to be exposed substantially over its entire length for 360° viewing by a perspective customer, is difficult to open in order to reach the article of merchandise and also has disadvantages in the molding process such as the heating and supporting of the article as will be set forth below.

In FIGURE 5, there is shown one-half of the mold utilized in the process of packaging the article 10 shown in FIGURES 1 and 2. The mold half 24 has a flat upper surface 26 on which has been formed an annular mold cavity 28 which conforms to the shape of the desired frame 12 shown in FIGURE 1. In the center of the mold cavity 28 there is provided a center portion 30 which has a mold cavity 32 therein conforming to one-half of the article to be packaged and adapted to support the same. The upper mold half 34 is the mirror image of the lower mold half 24 and also includes a mold cavity 36 annular in shape and conforming to the shape of the frame 12. The center portion 38 of the upper mold half 34 has an article receiving mold cavity 40 therein which in cooperation with the mold cavity 32, when the mold halves 24 and 34 are brought into facing engagement, as shown in FIGURE 7, will provide a cavity for receiving the article 10 with only the top and bottom portions 42 and 44 respectively fitting within the resultant mold cavity formed by the upper and lower mold cavities 28 and 36 respectively. The upper mold cavity 36 has at the bottom thereof suitable passageways 46 for receiving from a central supply 48 the mold material which, as stated previously, can be polystyrene beads which will expand under heat to fill the mold cavity, or injected hot liquid molding material which, upon cooling, will form the solid frame 12. It will be understood that any known method of molding the frame 12 can be utilized in accordance with the principles of the present invention. However, most of the presently known methods require some form of heat to be utilized to form the frame 12. Since this heat could effect the article being packaged, it is undesirable. However, the present invention contemplates the placement of the mold 360° about the surface of the packaged article 10 leaving exposed only the end portions 42 and 44 necessary for supporting the article 10 in its finished packaged state. Thus, with only a very minor portion of the article 10 being exposed to the hot plastic material, the article 10 will not be heated to any substantial degree during the short molding process and, accordingly, there will be no deleterious effect on the packaged article 10. Thus the packaged article can be manufactured by injection molding of a thermoplastic or thermosetting material, blow molding, or by utilizing beads of polystrene foam.

In FIGURE 9, there is shown another embodiment of the present invention utilizing the same molding techniques except that the article 50 is supported within a C-shaped frame 52 rather than the O-shaped frame 12 as set forth in FIGURES 1–7. The C-shaped frame 52 comprises a vertical portion 54 and a top horizontal leg 56 and a bottom horizontal leg 58. The frame 52 is shown with a parting line 60 showing where the mold faces met during the molding process. The articles 50 has a cap 62 and a bottom 64. The cap 62 has a recess 66 and a bottom 64 is also recessed. The recesses 64 and 66 form supporting portions for the article 50 as the plastic material can fit within the recesses 64 and 66 to support and hold the article 50 in place within the frame 52. It should be noted that the top leg 56 or the bottom leg 58 need merely be bent backward to release the article 50. Thus the article 50 can be more easily removed from the frame 52 than the article 10 of the frame 12. Further, it should be noted that the overall dimensions of the frame 52 are greater than the overall dimensions of the article 50 so that the article 50 is protected from all sides.

Still further, it should be noted that the article 50 has 360° visibility over its entire length and, additionally, since the side, top, bottom and back walls of the frame 52 are flat, the packaged article can be easily stacked.

The article 50 is packaged by placing it within a mold cavity similar to that shown in FIGURE 5 and 6 so that, when the article is packaged, the hot molding material is in contact with only a minimum portion of the surface of the article 50 and, accordingly, the article 50 will not be effected by the heat of the molding material.

The present invention may be embodied in other specific forms without departing from the spirit or essential attributes thereof and, accordingly, reference should be made to the appended claims rather than to the foregoing specification as indicating the scope of the invention.

I claim in my invention:

1. Method of packaging an article of merchandise comprising providing a mold having a first article receiving cavity therein designed to envelope the article of merchandise 360° about its surface over substantially its entire length, additionally providing said mold with a second cavity extending continuously about the article receiving cavity from one end thereof to the other end thereof, placing an article into said article receiving cavity with its ends extending into said second cavity, filling said second mold cavity with moldable material, whereby said moldable material, when solidified, will form an integral solid protective frame supporting the ends of the article with the article having 360° exposure about its surface over substantially its entire length.

2. The process of claim 1 including the step of heating the moldable material to aid the step of filling the second mold cavity, said step of providing an article receiving cavity being operative to allow only a minor portion of the ends of said article placed within said article receiving cavity to be exposed in said second mold cavity whereby said article is only minimally heated during said process.

References Cited

UNITED STATES PATENTS 3,161,339  12/1964  Weller _____ 206—46 XR
3,273,327   9/1966  Hoffman.

FOREIGN PATENTS 211,731  10/1960  Austria.
852,413  10/1960  Great Britain.
959,808   3/1957  Germany.

JULIUS FROME, *Primary Examiner.*

PHILIP E. ANDERSON, *Assistant Examiner.*

U.S. Cl. X.R.

18—5, 30; 206—46, 259, 271